US012270745B1

(12) United States Patent
Jia et al.

(10) Patent No.: US 12,270,745 B1
(45) Date of Patent: Apr. 8, 2025

(54) SINGLE PULSE SPECTRAL STATISTICAL ANALYSIS METHOD FOR PARTICLE SIZE DISTRIBUTION OF INCLUSION ON SURFACE OF METAL MATERIAL

(71) Applicants: NCS Testing Technology Co., Ltd., Beijing (CN); NCS Jiangsu Testing Technology Co., Ltd., Suzhou (CN)

(72) Inventors: Yunhai Jia, Beijing (CN); Liang Sheng, Beijing (CN); Lei Yu, Beijing (CN); Liangjing Yuan, Beijing (CN); Shanshan Xu, Beijing (CN)

(73) Assignees: NCS Testing Technology Co., Ltd., Beijing (CN); NCS Jiangsu Testing Technology Co., Ltd., Suzhou (CN)

( * ) Notice: Subject to any disclaimer, the term of this patent is extended or adjusted under 35 U.S.C. 154(b) by 0 days.

(21) Appl. No.: 18/782,044

(22) Filed: Jul. 24, 2024

(51) Int. Cl.
G01N 15/02 (2024.01)
G01N 15/00 (2024.01)

(52) U.S. Cl.
CPC . *G01N 15/0266* (2013.01); *G01N 2015/0061* (2013.01)

(58) Field of Classification Search
CPC ............ G01N 15/0266; G01N 2015/0061
See application file for complete search history.

(56) References Cited

U.S. PATENT DOCUMENTS

2024/0159680 A1* 5/2024 Jia ................ G01N 21/67

OTHER PUBLICATIONS

Determination of content of nonmetallic inclusions in steel—Extremum analytical method, China National Standards, 2021, pp. 1-22.

* cited by examiner

Primary Examiner — Manuel A Rivera Vargas
(74) Attorney, Agent, or Firm — Bayramoglu Law Offices LLC

(57) ABSTRACT

A single pulse spectral statistical analysis method for particle size distribution of inclusions on a surface of a metal material is provided. The method includes the following steps: analyzing a surface of an oversized metal material through single pulse discharge continuous excitation scanning to obtain mixed intensity data of spectral intensities of solid solution and inclusions of an inclusion element on the surface of the oversized metal material and a relative frequency distribution diagram; performing peak fitting processing on the relative frequency distribution diagram of the mixed spectral intensities to obtain a relative frequency distribution diagram of the spectral intensities of the inclusion; and correlating particle size information of inclusions of a small sample with distribution data of the spectral intensities of the inclusions to determine a corresponding relation between the particle sizes and the spectral intensities of the inclusions, thereby obtaining a particle size distribution result.

8 Claims, 5 Drawing Sheets

SINGLE PULSE SPECTRAL STATISTICAL ANALYSIS METHOD FOR PARTICLE SIZE DISTRIBUTION OF INCLUSION ON SURFACE OF METAL MATERIAL

TECHNICAL FIELD

The present invention relates to the technical field of surface characterization of a metal material, and in particular to a single pulse spectral statistical analysis method for particle size distribution of inclusions on a surface of a metal material.

BACKGROUND

Global characterization of inclusions on a surface of an oversized metal material is a difficult and extremely complex technology. In various means for characterization of inclusions in a material, conventional analysis methods such as a metallographic method and a scanning electron microscope method are usually only for detection areas smaller than 200 mm$^2$, and cannot directly implement characterization of inclusion distribution in an oversized sample range. A metal bulk sample electrolysis method can analyze inclusions larger than 50 μm in a metal sample with a size of 100 mm, but the process is complex and takes more than 2 weeks, and therefore the method cannot be used as a conventional convenient method for implementing characterization of inclusions in a large size. An extreme value method, as a method for indirectly detecting inclusions in an oversized metal material sample, can only deduce information characterizing the maximum inclusion, and cannot provide particle size distribution of the inclusions. In addition, some spectral analysis methods can characterize inclusions on a surface of a metal material and distribution information thereof, and a method for separating intensity signals of an inclusion element by a roughening method with an intensity larger than a threshold intensity cannot strictly determine actual relative frequency distribution of inclusion intensity signals, a smaller inclusion signal is considered as a solid solution element signal, and a larger solid solution element intensity is considered as an inclusion signal.

Therefore, a single pulse spectral statistical analysis method for particle size distribution of inclusions on a surface of a metal material is provided, including: performing pulse excitation once based on using a spark light source, wherein only a plurality of single sparks are excited on the surface of the metal material, and collecting intensities of the single sparks to complete, with a relative movement of the light source, continuous scanning analysis on the surface of the metal material. That is, single pulse continuous scanning analysis is performed to resolve difficulties of the prior art.

SUMMARY

In view of this, the present invention provides a single pulse spectral statistical analysis method for particle size distribution of inclusions on a surface of a metal material, comprising: analyzing a surface of an oversized metal material through single pulse discharge continuous excitation scanning to obtain mixed intensity and relative frequency distribution diagrams of the spectral intensity of inclusion elements, performing peak fitting processing to obtain the relative frequency distribution diagram of the spectral intensity signals of the inclusions, and correlating particle size information under a scanning electron microscope with inclusion signal data information of a oversized metal sample, which is obtained through spark spectrum analysis to determine a relation between particle sizes and intensities of the inclusions. In this way, particle size distribution information of inclusions of the large-sized sample is obtained, and a problem of analysis on particle size distribution of inclusions on the surface of the oversized metal material is resolved.

In order to achieve the above objective, the present invention adopts the following technical solutions:

a single pulse spectral statistical analysis method for particle size distribution of inclusions on a surface of an oversized metal material, comprising the following steps:

S1: analyzing a surface of an oversized metal material through single pulse discharge continuous excitation scanning to obtain mixed distribution data of spectral intensities of solid solution and inclusions of an inclusion element on the surface of the oversized metal material;

S2: summarizing the mixed distribution data of the spectral intensities of the solid solution and the inclusions of the inclusion element to obtain a relative frequency distribution diagram of the spectral intensities of the solid solution and the inclusions of the inclusion element;

S3: performing peak fitting processing on the relative frequency distribution diagram of the spectral intensities to obtain distribution data of the spectral intensities of the inclusions;

S4: taking a test portion with a set area in the surface of the oversized metal material as a small sample, and obtaining quantity and particle size information of inclusions of the small sample; and S5: correlating the particle size information of the inclusions of the small sample with the distribution data of the spectral intensities of the inclusions, and determining a corresponding relation between the particle sizes and the spectral intensities of the inclusions to obtain a particle size distribution result of the inclusions on the surface of the oversized metal material, wherein the analyzing through single pulse continuous scanning in S1 is performing pulse excitation once based on using a spark light source, wherein only a plurality of single sparks are excited on the surface of the metal material, and collecting intensities of the single sparks to complete, with a relative movement of the light source, continuous scanning analysis on the surface of the metal material.

In the above method, optionally, the analyzing a surface of an oversized metal material through single pulse discharge continuous excitation scanning to obtain mixed distribution data of spectral intensities of solid solution and inclusions of an inclusion element on the surface of the oversized metal material in S1 specifically comprises:

first placing a scanning probe at a leftmost position of an upper end of the oversized metal material in a Y direction, and performing single pulse spark discharge scanning from left to right in an X direction; and after scanning of a first line is completed, placing the scanning probe at a leftmost position of a second line of the upper end of the oversized metal material in the Y direction, and completing scanning of the second line from left to right, and so forth until all lines of the oversized metal material are scanned from top to bottom, to obtain the mixed distribution data of the spectral intensities of the solid solution and the inclusions of the inclusion element on the surface of the oversized metal material.

In the above method, optionally, the performing fitting processing on the relative frequency distribution diagram of the spectral intensities to obtain distribution data of the spectral intensities of the inclusions in S3 specifically comprises:

S31: performing composite function fitting processing on the relative frequency distribution diagram of the spectral intensities, and performing fitting and peak separation to obtain a normal distribution diagram with a left main peak and a generalized Pareto distribution diagram of the inclusions with a right tailed peak; and S32: obtaining the distribution data of the spectral intensities of the inclusions based on the generalized Pareto distribution diagram of the inclusions with the right tailed peak.

In the above method, optionally, the taking a test portion with a set area in the surface of the oversized metal material as a small sample in S4 specifically comprises:

obtaining an area $S_{large}$ of the surface of the oversized metal material, and obtaining a set area $S_{small}$ of the small sample; and the area of the surface of the oversized metal material and the set area of the small sample meet the following relation:

$T=S_{large}/S_{small}$, wherein

T is in the range of 100 to 10000.

In the above method, optionally, the taking a test portion with a set area in the surface of the oversized metal material as a small sample, and obtaining quantity and particle size information of inclusions of the small sample in S4 specifically comprises:

grinding and polishing a test portion with a set area in the surface of the oversized metal material to be used as a small sample, and placing the small sample under a scanning electron microscope to identify and quantitatively detect inclusions that are larger than 1 μm on a surface of the small sample; at the same time, introducing an aluminum foil into an edge of the small sample to correct a gray threshold of an electron microscope picture, and determining an identification brightness threshold of the inclusions; and when brightness of particles observed by the scanning electron microscope is less than the brightness threshold, determining the particles as the inclusions, performing energy spectrum analysis, recording and storing the quantity and particle size information of the inclusions, and recording particle size information of the maximum inclusion as first data.

In the above method, optionally, the taking a test portion with a set area in the surface of the oversized metal material as a small sample, and obtaining quantity and particle size information of inclusions of the small sample in S4 further comprises:

taking a test portion with a set area in the surface of the oversized metal material again, re-preparing a sample, grinding and polishing the sample to obtain a small sample, placing the small sample under the scanning electron microscope again, and recording the quantity and particle size information of the inclusions as well as the particle size information of the maximum inclusion as second data; repeating the sampling operation, re-preparing a sample, grinding and polishing the sample, and recording the quantity and particle size information of the inclusions as well as the particle size information of the maximum inclusion as third data; repeating the sampling operation until 24 sets of data are recorded; and based on an extreme value analysis method, calculating a particle size of the maximum inclusion formed on the surface of the oversized metal material by the inclusion element, wherein the particle size corresponds to a maximum intensity signal in the distribution data of the spectral intensities of the inclusions.

In the above method, optionally, the correlating the particle size information of the inclusions of the small sample with the distribution data of the spectral intensities of the inclusions, and determining a corresponding relation between the particle sizes and the spectral intensities of the inclusions to obtain a particle size distribution result of the inclusions on the surface of the oversized metal material in S5 specifically comprises:

S51: classifying and counting the particle size information of the inclusions under a scanning electron microscope to obtain groups of statistical frequencies with a group distance of 2 μm;

S52: dividing the distribution data of the spectral intensities of the inclusions into the same groups based on the statistical frequency with the group distance of 2 μm under the scanning electron microscope to obtain average particle sizes and average intensities of the groups;

S53: drawing an intensity-particle size correction curve according to a relation between the average intensity and the maximum intensity of each group obtained under the grouped frequencies and the average particle size and the maximum particle size of the inclusions; and S54: converting an intensity-relative frequency spectrogram into an inclusion particle size-frequency spectrogram according to an intensity-particle size correction curve, multiplying the inclusion particle size-frequency spectrogram by the total spectral intensity of the inclusion element to obtain an inclusion particle size distribution diagram, and distinguishing the inclusion particle size distribution diagram by a set group distance to obtain the particle size distribution result of the inclusions.

In the above method, optionally, the oversized metal material means that any side length of the metal material exceeds 300 mm; however, the method is also applicable to a large-sized metal material with a side length less than 300 mm.

According to the above technical solutions, compared with the prior art, the single pulse spectral statistical analysis method for particle size distribution of inclusions on a surface of a metal material provided in the present invention has the following beneficial effects: for a surface of an oversized metal material, spectral intensity signal data of an inclusion element in an oversized range is obtained by analyzing through single pulse discharge continuous excitation scanning, peak fitting processing is performed according to a relative frequency distribution diagram of intensities, and a solid solution intensity signal and an inclusion intensity signal of the element are separated to obtain an inclusion intensity distribution diagram, thereby implementing separation of the inclusion intensity signal and the solid solution signal of the element; and a small sample in the same oversized metal material is analyzed based on the scanning electron microscope, the particle size information of the inclusions under the scanning electron microscope is correlated with intensity distribution of the inclusions of the oversized metal material, which is obtained through the single pulse spark discharge scanning, and the corresponding relation between the particle sizes and the intensities of the inclusions is determined, thereby obtaining particle size distribution information of inclusions of an oversized metal sample. The method can effectively overcome a problem that distribution analysis of inclusions in a large area cannot be directly implemented due to a large size of a sample, and can quickly obtain an accurate distribution result of the inclusions on the surface of the oversized metal material.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are merely embodiments of the present invention, and those of ordinary skill in the art can obtain other drawings according to the drawings provided without creative efforts.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skill in the art without creative efforts shall fall within the protection scope of the present invention.

Figure 1:
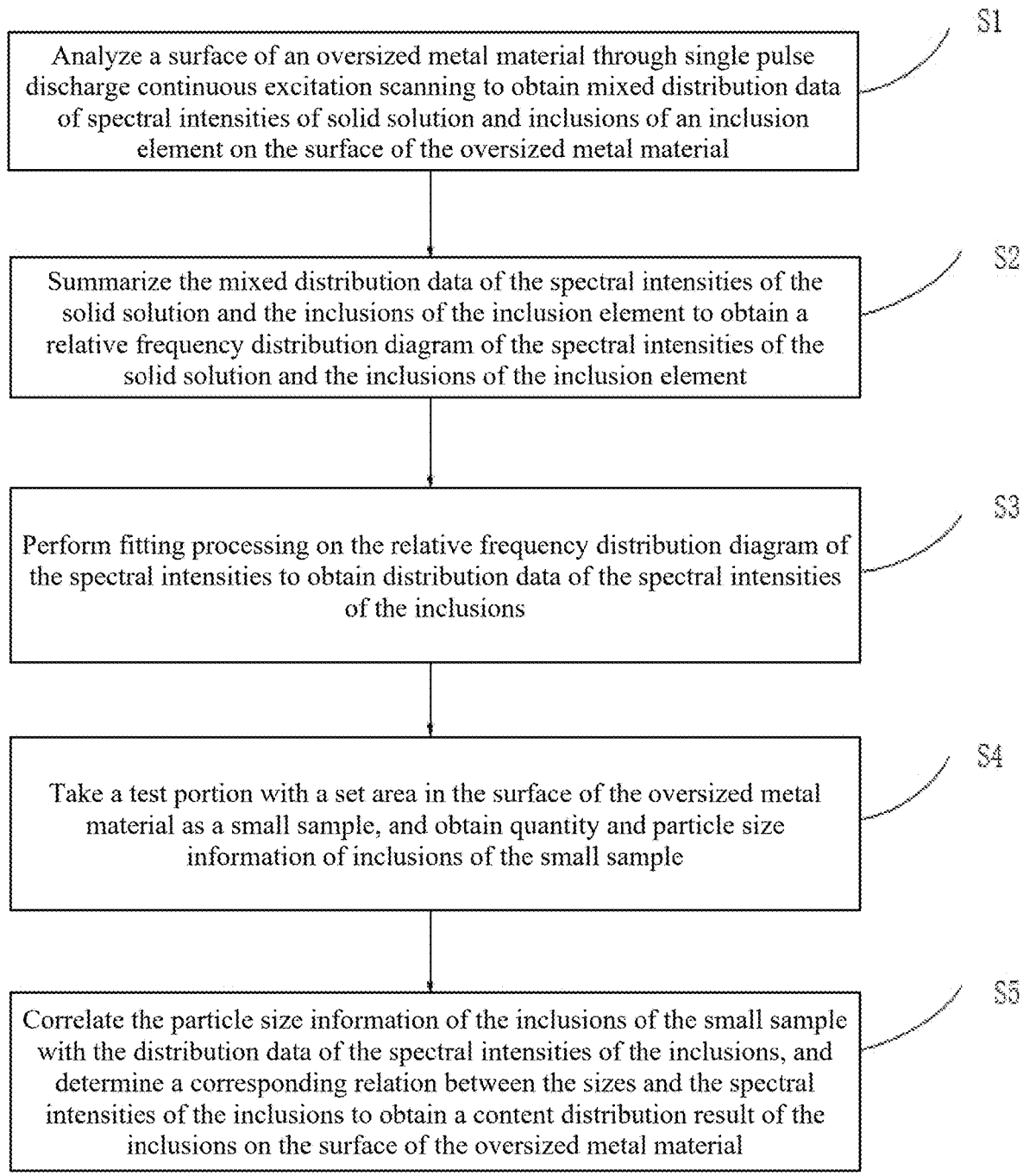
FIG. 1 is a flowchart of a single pulse spectral statistical analysis method for particle size distribution of inclusions on a surface of a metal material according to the present invention.

Referring to FIG. 1, the present invention discloses a single pulse spectral statistical analysis method for particle size distribution of inclusions on a surface of a metal material, including the following steps:

S1: analyzing a surface of an oversized metal material through single pulse discharge continuous excitation scanning to obtain mixed distribution data of spectral intensities of solid solution and inclusions of an inclusion element on the surface of the oversized metal material;

S2: summarizing the mixed distribution data of the spectral intensities of the solid solution and the inclusions of the inclusion element to obtain a relative frequency distribution diagram of the spectral intensities of the solid solution and the inclusions of the inclusion element;

S3: performing peak fitting processing on the relative frequency distribution diagram of the spectral intensities to obtain distribution data of the spectral intensities of the inclusions;

S4: taking a test portion with a set area in the surface of the oversized metal material as a small sample, and obtaining quantity and particle size information of inclusions of the small sample; and S5: correlating the particle size information of the inclusions of the small sample with the distribution data of the spectral intensities of the inclusions, and determining a corresponding relation between the particle sizes and the spectral intensities of the inclusions to obtain a particle size distribution result of the inclusions on the surface of the oversized metal material.

The analyzing through single pulse continuous scanning in S1 is performing pulse excitation once based on using a spark light source, where only a plurality of single sparks are excited on the surface of the metal material, and collecting intensities of the single sparks to complete, with a relative movement of the light source, continuous scanning analysis on the surface of the metal material.

Further, the analyzing a surface of an oversized metal material through single pulse discharge continuous excitation scanning to obtain mixed distribution data of spectral intensities of solid solution and inclusions of an inclusion element on the surface of the oversized metal material in S1 specifically includes:

first placing a scanning probe at a leftmost position of an upper end of the oversized metal material in a Y direction, and performing single pulse spark discharge scanning from left to right in an X direction; and after scanning of a first line is completed, placing the scanning probe at a leftmost position of a second line of the upper end of the oversized metal material in the Y direction, and completing scanning of the second line from left to right, and so forth until all lines of the oversized metal material are scanned from top to bottom, to obtain the mixed distribution data of the spectral intensities of the solid solution and the inclusions of the inclusion element on the surface of the oversized metal material.

Further, the performing fitting processing on the relative frequency distribution diagram of the spectral intensities to obtain distribution data of the spectral intensities of the inclusions in S3 specifically includes:

S31: performing composite function fitting processing on the relative frequency distribution diagram of the spectral intensities, and performing fitting and peak separation to obtain a normal distribution diagram with a left main peak and a generalized Pareto distribution diagram of the inclusions with a right tailed peak; and S32: obtaining the distribution data of the spectral intensities of the inclusions based on the generalized Pareto distribution diagram of the inclusions with the right tailed peak.

Further, the taking a test portion with a set area in the surface of the oversized metal material as a small sample in S4 specifically includes:

obtaining an area $S_{large}$ of the surface of the oversized metal material, and obtaining a set area $S_{small}$ of the small sample.

The area of the surface of the oversized metal material and the set area of the small sample meet the following relation:

$$T = S_{large}/S_{small}, \text{ where}$$

T is in the range of 100 to 10000.

Further, the taking a test portion with a set area in the surface of the oversized metal material as a small sample, and obtaining quantity and particle size information of inclusions of the small sample in S4 specifically includes:

grinding and polishing a test portion with a set area in the surface of the oversized metal material to be used as a small sample, and placing the small sample under a scanning electron microscope to identify and quantitatively detect inclusions that are larger than 1 μm on a surface of the small sample; at the same time, introducing an aluminum foil into an edge of the small sample to correct a gray threshold of an electron microscope picture, and determining an identification brightness threshold of the inclusions; and when brightness of particles observed by the scanning electron microscope is less than the brightness threshold, determining the particles as the inclusions, performing energy spectrum analysis, recording and storing the quantity and particle size information of the inclusions as well as the particle size information of the maximum inclusion as first data.

Further, the taking a test portion with a set area in the surface of the oversized metal material as a small sample, and obtaining quantity and particle size information of inclusions of the small sample in S4 further includes:

taking a test portion with a set area in the surface of the oversized metal material again, re-preparing a sample, grinding and polishing the sample to obtain a small sample, placing the small sample under the scanning electron microscope again, and recording the quantity and particle size information of the inclusions as well as the particle size information of the maximum inclusion as second data; repeating the sampling operation, re-preparing a sample, grinding and polishing the sample, and recording the quantity and particle size information of the inclusions as well as the particle size information of the maximum inclusion as third data; repeating the sampling operation until 24 sets of data are recorded; and based on an extreme value analysis method, calculating a particle size of the maximum inclusion formed on the surface of the oversized metal material by the inclusion element, where the particle size corresponds to a maximum intensity signal in the distribution data of the spectral intensities of the inclusions.

Further, the correlating the particle size information of the inclusions of the small sample with the distribution data of the spectral intensities of the inclusions, and determining a corresponding relation between the particle sizes and the spectral intensities of the inclusions to obtain a particle size distribution result of the inclusions on the surface of the oversized metal material in S5 specifically includes:

S51: classifying and counting the particle size information of the inclusions under a scanning electron microscope to obtain groups of statistical frequencies with a group distance of 2 μm;

S52: dividing the distribution data of the spectral intensities of the inclusions into the same groups based on the statistical frequency with the group distance of 2 μm under the scanning electron microscope to obtain average particle sizes and average intensities of the groups;

S53: drawing an intensity-particle size correction curve according to a relation between the average intensity and the maximum intensity of each group obtained under the grouped frequencies and the average particle size and the maximum particle size of the inclusions; and S54: converting an intensity-relative frequency spectrogram into an inclusion particle size-frequency spectrogram according to an intensity-particle size correction curve, multiplying the inclusion particle size-frequency spectrogram by the total spectral intensity of the inclusion element to obtain an inclusion particle size distribution diagram, and distinguishing the inclusion particle size distribution diagram by a set group distance to obtain the particle size distribution result of the inclusions.

Further, the oversized metal material means that any side length of the metal material exceeds 300 mm; however, the method is also applicable to a large-sized metal material with a side length less than 300 mm.

Figure 3:
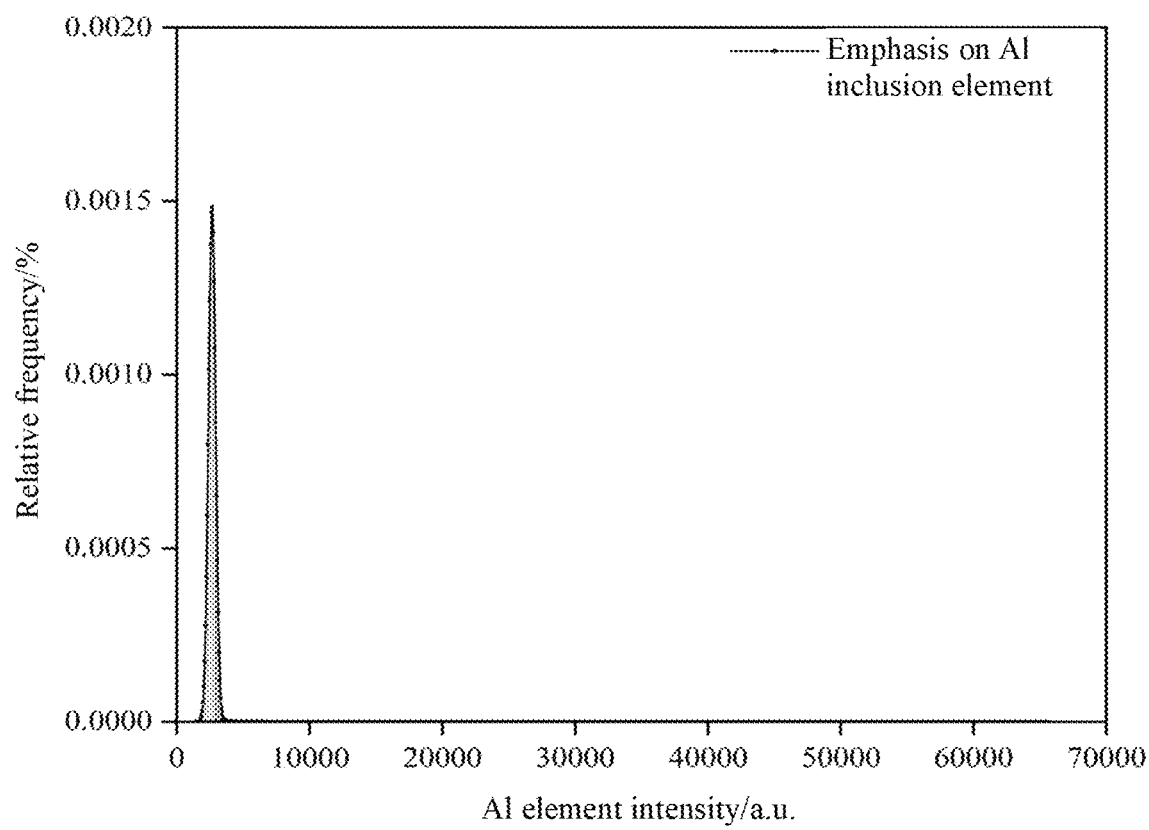
FIG. 3 is a schematic diagram of relative frequency distribution of intensities of solid solution and inclusions of an Al element according to an embodiment of the present invention.
Figure 4:
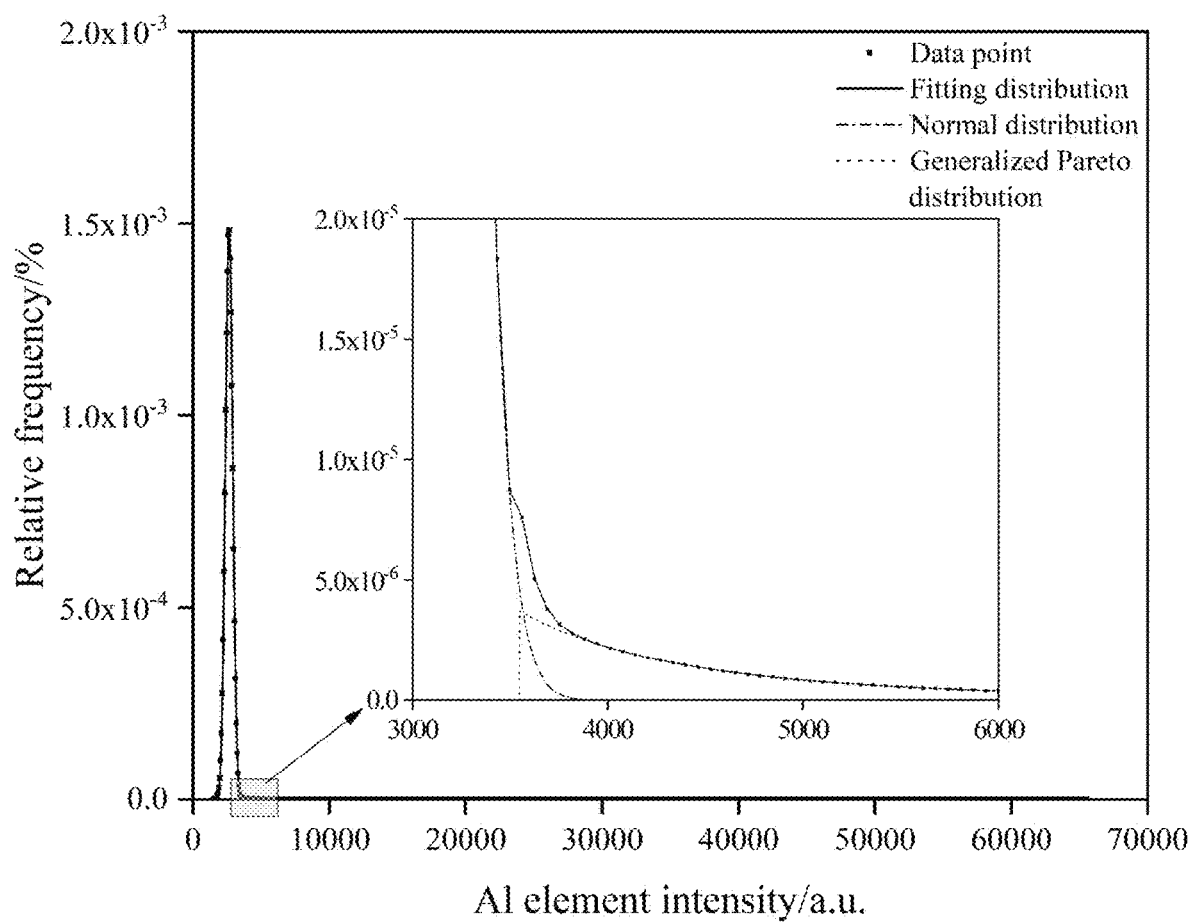
FIG. 4 is a schematic diagram of peak fitting of intensity distribution and frequency distribution of an Al element according to an embodiment of the present invention.
Figure 5:
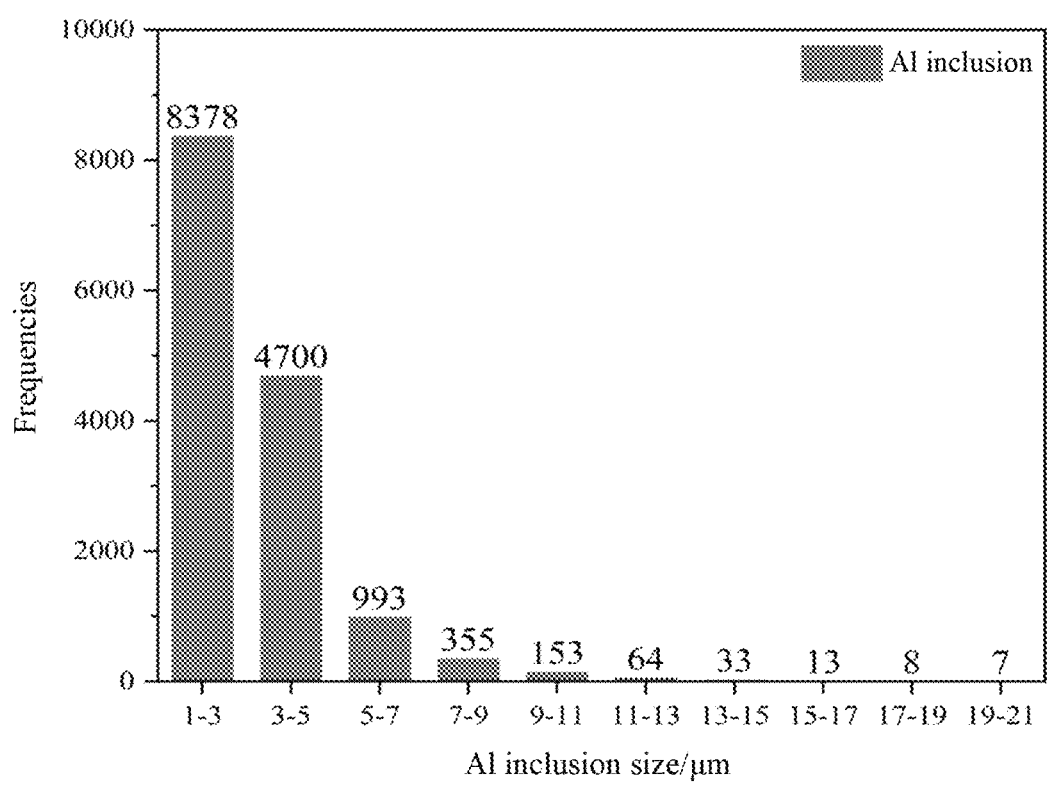
FIG. 5 is a diagram of a particle size distribution result of inclusions of an Al element according to an embodiment of the present invention.

In a specific embodiment, the single pulse spectral statistical analysis method for particle size distribution of inclusions on a surface of a metal material provided in the present invention includes the following steps:

analyzing a surface of an oversized metal material through single pulse discharge continuous excitation scanning to obtain mixed distribution data of spectral intensities of solid solution and inclusions of an inclusion element on the surface of the oversized metal material;

summarizing the mixed distribution data of the spectral intensities of the solid solution and the inclusions of the inclusion element to obtain a relative frequency distribution diagram of the spectral intensities of the solid solution and the inclusions of the inclusion element; taking an Al element as an example, a schematic diagram of relative frequency distribution of intensities of solid solution and inclusions of the Al element is shown in FIG. 3, and it can be seen from FIG. 3 that the whole relative frequency distribution of the intensities is right-skewed distribution, and the main reason for right skew is that an intensity of aluminum inclusions exceeds an intensity of aluminum solid solution;

performing fitting processing on the relative frequency distribution diagram of the spectral intensities to obtain distribution data of the spectral intensities of the inclusions; taking the Al element as an example, a schematic diagram of fitting of intensity distribution and frequency distribution of the Al element is shown in FIG. 4, and it can be seen that a main peak is mainly relative frequency distribution of intensities of solid solution Al, and a right-skewed or tailed part is mainly relative frequency distribution of intensities of inclusion Al;

taking a test portion with a set area in the surface of the oversized metal material as a small sample, and obtaining quantity and particle size information of inclusions of the small sample; and correlating the particle size information of the inclusions of the small sample with the distribution data of the spectral intensities of the inclusions, and determining a corresponding relation between the particle sizes and the spectral intensities of the inclusions to obtain a particle size distribution result of the inclusions on the surface of the oversized metal material; taking the Al element as an example, a particle size distribution result of inclusions of the Al element is shown in FIG. 5, and it can be seen that particle sizes of the inclusions of the Al element in a whole large-sized sample are concentrated in the range of 1 μm to 3 μm, and the number of Al inclusions larger than 21 μm is the least.

Figure 2:
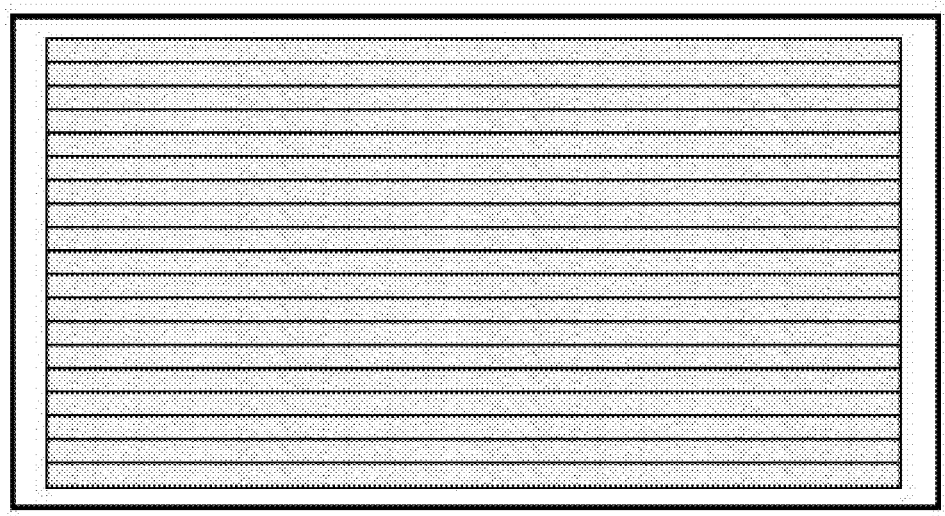
FIG. 2 is a schematic diagram of analysis through single pulse discharge continuous excitation scanning according to the present invention.

Analyzing a surface of an oversized metal material through single pulse spark discharge continuous excitation scanning to obtain mixed distribution data of spectral intensities of solid solution and inclusions of an inclusion element on the surface of the oversized metal material includes that;

FIG. 2 shows a schematic diagram of analysis through single pulse discharge continuous excitation scanning, the surface of the oversized metal material is analyzed through the single pulse discharge continuous excitation scanning, a scanning probe is first placed at a leftmost position of an upper end of the oversized metal material in a Y direction, and single pulse spark discharge scanning is performed from left to right in an X direction; and after scanning of a first line is completed, the scanning probe is placed at a leftmost position of a second line of the upper end of the oversized metal material in the Y direction, and scanning of the second line from left to right is completed, and so forth until all lines of the oversized metal material are scanned from top to bottom, to obtain the mixed distribution data of the spectral intensities of the solid solution and the inclusions of the inclusion element on the surface of the oversized metal material. (The Y direction is the vertical axis direction, and the X direction is the horizontal axis direction).

In a common scanning analysis method, a multichannel element single pulse excitation source is adopted to excite a sample, a scanning position is accurately positioned, and a corresponding multichannel element single pulse emission spectral intensity I (X, Y) is obtained at each position (X, Y). Intensities I (X, Y) of detected elements are arranged from small to large, and a distribution diagram of 256 intensity signals is obtained according to a corresponding group distance. For an inclusion signal in the element, spectral intensity signal distribution is tailed distribution on the right side of normal distribution, that is, an average value is not in the center of the distribution diagram. The main reason for forming the tailed distribution is that after forming an inclusion, a non-solid solution part of the element is present as a concentrate of the inclusion element in spectral signals, which causes a high intensity of the spectral signal of the inclusion element. Larger size and area of the inclusion indicate a higher degree of concentration of the inclusion element and larger corresponding spectral intensity.

In the present invention, for the analysis of the inclusions on the surface of the oversized metal material, a single pulse discharge continuous excitation scanning analysis method is adopted. Firstly, a spectral analysis system is configured, and an excitation source is a solid-state pulse discharge light source. An optical system is configured. The optical system may be a Rowland circle or another optical system. A light intensity collecting component may be a photomultiplier tube or a CCD detector or a CMOS detector. An X-direction and Y-direction precision transmission device is adopted. In a common scanning analysis method, a multichannel spark excitation source is adopted to excite a sample, a scanning position is accurately positioned, and a corresponding spark emission spectral intensity I (X, Y) is obtained at each position (X, Y). Spark emission intensities I (X, Y) of elements are counted and arranged from small to large, and a frequency distribution diagram of 256 intensity signals is obtained according to a corresponding group distance. Mathematical fitting processing is performed on a distribution frequency histogram of intensities of the inclusion element, so that a relative frequency distribution diagram of intensities of the inclusions is obtained, and the maximum intensity $A_{max}$ of the inclusion element is obtained.

The performing fitting processing on the relative frequency distribution diagram of the spectral intensities to obtain distribution data of the spectral intensities of the inclusions includes that:

composite function fitting processing is performed on the relative frequency distribution diagram of the spectral intensities to obtain a normal distribution diagram with a left main peak and a generalized Pareto distribution diagram of the inclusions with a right tailed peak.

The left main peak is distribution of intensities of a solid solution part of the element. The distribution is Gaussian function distribution, and the function expression is as follows:

$$f(x) = \frac{1}{\sqrt{2\pi}\sigma} \exp\left(-\frac{(x-\mu)^2}{2\sigma^2}\right)$$

where μ is an expected value of the average value, and σ is a standard deviation.

The right tailed peak is distribution of intensities of the inclusions of the inclusion element. The distribution is generalized Pareto distribution, and the function expression is as follows:

$$g(x) = \frac{\alpha}{\delta}\left(\frac{x-\lambda}{\delta}\right)^{-\alpha-1}$$

where λ is a positioning parameter, δ is a scale parameter, and α is a shape parameter.

A function distribution expression of the fitted total intensity of the element (including the solid solution and the inclusions) is as follows:

$$F(x) = \frac{1}{\sqrt{2\pi}\sigma} \exp\left(-\frac{(x-\mu)^2}{2\sigma^2}\right) + \frac{\alpha}{\delta}\left(\frac{x-\lambda}{\delta}\right)^{-\alpha-1}.$$

The distribution data of the spectral intensities of the inclusions is obtained based on the generalized Pareto distribution diagram of the inclusions with the right tailed peak. A tailed peak function is an intensity and frequency distribution function of the inclusions, and when an intensity starts to emerge in an intensity and relative frequency distribution diagram, the intensity is an intensity threshold. In this way, the intensity of the solid solution—the relative frequency distribution and the intensity of the inclusions—the relative frequency distribution of the element are accurately distinguished.

In the present invention, processing through a fitting and peak separation mathematical model is performed on the relative frequency of the intensities of the inclusion element, so that spark intensity distribution is decomposed into normal distribution and generalized Pareto distribution. However, the processing is not limited to peak separation of the relative frequency distribution of the intensities of the inclusion element and the generalized Pareto distribution, but is also applicable to other extreme value distribution.

In the present invention, according to Determination of Content of Nonmetallic Inclusions in Steel-Extremum Analytical Method of Standard GB/T 40281-2021, a small part of a test portion (with an area of $S_{small}$) in the oversized metal material (with a scanning area of $S_{large}$) is taken.

The taking a test portion with a set area in the surface of the oversized metal material as a small sample includes that:
- an area of the surface of the oversized metal material is obtained and expressed as $S_{large}$, for example, 160000 mm$^2$; and
- a set area of the small sample is obtained and expressed as $S_{small}$, for example, 160 mm$^2$.

The area of the surface of the oversized metal material and the set area of the small sample meet the following relation:

$$T = S_{large}/S_{small}, \text{ where}$$

T is in the range of 100 to 10000. An estimated maximum inclusion probability is 99% to 99.99%. A value of $S_{small}$ of a small part of the sample can be determined according to values of the actual scanning area $S_{large}$ and T.

The taking a test portion with a set area in the surface of the oversized metal material as a small sample, and obtaining quantity and particle size information of inclusions of the small sample includes that:
- a test portion with a set area in the surface of the oversized metal material is ground and polished to be used as a small sample, and the small sample is placed under a scanning electron microscope to identify and quantitatively detect inclusions that are larger than 1 μm on a surface of the small sample; at the same time, an aluminum foil is introduced into an edge of the small sample to correct a gray threshold of an electron microscope picture, and an identification brightness threshold of the inclusions is determined; and when brightness of particles observed by the scanning electron microscope is less than the brightness threshold, the particles are determined as the inclusions, energy spectrum analysis is performed, and the quantity and particle size information of the inclusions as well as the particle size information of the maximum inclusion are recorded and stored as first data.

The taking a test portion with a set area in the surface of the oversized metal material as a small sample, and obtaining quantity and particle size information of inclusions of the small sample further includes that:
- a test portion with a set area in the surface of the oversized metal material is taken again, a sample is re-prepared, the sample is ground and polished to obtain a small sample, the small sample is placed under the scanning electron microscope again, and the quantity and particle size information of the inclusions as well as the particle size information of the maximum inclusion are recorded as second data; repeating the sampling operation, re-preparing a sample, the sample is ground and polished, and the quantity and particle size information of the inclusions as well as the particle size information of the maximum inclusion are recorded as third data; and the sampling operation is repeated until 24 sets of data are recorded. According to Determination of Content of Nonmetallic Inclusions in Steel-Extremum Analytical Method of Standard GB/T 40281-2021, particle size information $D_{max}$ of the maximum inclusion formed by the inclusion element on $S_{large}$ is calculated by aggregating 24 sets of particle size information of the maximum inclusion of the element. In this case, it is calculated that the particle size of the maximum inclusion of the inclusion element corresponds to the maximum intensity $A_{max}$ in the generalized Pareto distribution.

The correlating the particle size information of the inclusions of the small sample with the distribution data of the spectral intensities of the inclusions, and determining a corresponding relation between the particle sizes and the spectral intensities of the inclusions to obtain a particle size distribution information of the inclusions on the surface of the oversized metal material includes that:
- the particle size information of the inclusions under the scanning electron microscope is classified and counted in an equivalent diameter mode, for example, 1 μm to 3 μm, 3 μm to 5 μm, 5 μm to 7 μm, 7 μm to 9 μm, 9 μm to 11 μm, 11 μm to 13 μm, and 13 μm to 15 μm, to obtain groups of statistical frequencies with a group distance of 2 μm;
- the distribution data of the spectral intensities of the inclusions is divided into the same groups based on the statistical frequencies with the group distance of 2 μm under the scanning electron microscope to obtain average particle sizes and average intensities of the groups, which are respectively marked as $D_1$, $D_2$, $D_3$, $D_4$, $A_1$, $A_2$, $A_3$ and $A_4$;
- an intensity-area correction curve is drawn according to a relation between the average intensity and the maximum intensity of the groups obtained under the grouped frequencies and the average particle size and the maximum particle size of the inclusions, specifically, in several documents describing analysis on inclusions through spark spectrum, intensities and particle sizes of the inclusions are in positive parabolic correlation, and a correction curve may be drawn according to data such as $(D_1, A_1)$, $(D_2, A_2)$, $(D_3, A_3)$, $(D_4, A_4)$, and $(D_{max}, A_{max})$ to obtain $A = aD^2 + bD + c$;
- and then an intensity-relative frequency spectrogram is converted into an inclusion particle size-frequency spectrogram according to an intensity and inclusion particle size correction curve, the inclusion particle size-frequency spectrogram is multiplied by the total spectral intensity of the inclusion element to obtain an inclusion particle size distribution diagram, and the inclusion particle size distribution diagram is distinguished by a set group distance to obtain the particle size distribution result of the inclusions.

In the present invention, the particle size information counted according to Determination of Content of Nonmetallic Inclusions in Steel-Extremum Analytical Method of Standard GB/T 40281-2021 is not limited to length, equivalent diameter, area, and the like. In addition, according to Determination of Content of Nonmetallic Inclusions in Steel-Extremum Analytical Method of Standard GB/T 40281-2021, a test quantity and a test area of samples are not limited to 24 sets of test data and the test area of 160 mm$^2$.

In conclusion, according to the single pulse spectral statistical analysis method for particle size distribution of inclusions on a surface of a metal material provided in the present invention, a surface of a metal material is analyzed through single pulse spark discharge continuous excitation scanning to obtain distribution data of spectral intensities of solid solution and inclusions of an element on the surface of the metal material. The obtained data is summarized to obtain a mixed relative frequency distribution diagram of the intensities of the solid solution and the inclusions of the element. Fitting processing is performed on the distribution diagram, and a solid solution intensity signal and an inclusion intensity signal of the element are separated to obtain an inclusion intensity distribution diagram, thereby implementing separation of the inclusion intensity signal and the solid solution signal. A small part of a test portion in a large-sized metal sample (with an area of $S_{large}$) is taken as a small sample (with an area of $S_{small}$), surface sample preparation is performed according to a requirement for detecting inclusions, the small sample is placed under a scanning electron microscope, and quantity and particle size information of inclusions of the small sample is summarized according to analysis of the scanning electron microscope. The particle size information of the inclusions under the scanning electron microscope is correlated with intensity distribution of the inclusions of the oversized metal sample, which is obtained through single pulse spark discharge scanning, and a corresponding relation between the particle sizes and intensities of the inclusions is determined. In this way, particle size distribution information of the inclusions of the large-sized metal sample is obtained, and the problem of analysis on particle size distribution of inclusions of the oversized metal materials is resolved.

The above description of the disclosed embodiments enables those skilled in the art to implement or use the present invention. Various modifications to these embodiments will be apparent to those skilled in the art, and the generic principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

What is claimed is:

1. A single pulse spectral statistical analysis method for particle size distribution of inclusions on a surface of an oversized metal material, comprising the following steps:
   S1: analyzing a surface of an oversized metal material through single pulse discharge continuous excitation scanning to obtain mixed distribution data of spectral intensities of solid solution and inclusions of an inclusion element on the surface of the oversized metal material;
   S2: summarizing the mixed distribution data of the spectral intensities of the solid solution and the inclusions of the inclusion element to obtain a relative frequency distribution diagram of the spectral intensities of the solid solution and the inclusions of the inclusion element;
   S3: performing fitting processing on the relative frequency distribution diagram of the spectral intensities to obtain distribution data of spectral intensities of the inclusions;
   S4: taking a test portion with a set area in the surface of the oversized metal material as a sample, and obtaining quantity and particle size information of inclusions of the sample; and
   S5: correlating the particle size information of the inclusions of the sample with the distribution data of the spectral intensities of the inclusions, and determining a corresponding relation between particle sizes and the spectral intensities of the inclusions to obtain a particle size distribution result of the inclusions on the surface of the oversized metal material, wherein
   the operation of analyzing through the single pulse discharge continuous excitation scanning in S1 is performing pulse excitation once based on using a spark light source, wherein only a plurality of single sparks are excited on the surface of the metal material, and collecting intensities of the plurality of single sparks to complete, with a relative movement of the light source, continuous scanning analysis on the surface of the metal material.

2. The single pulse spectral statistical analysis method for the particle size distribution of the inclusions on the surface of the oversized metal material according to claim 1, wherein
   the operation of analyzing the surface of the oversized metal material through the single pulse discharge continuous excitation scanning to obtain the mixed distribution data of the spectral intensities of the solid solution and the inclusions of the inclusion element on the surface of the oversized metal material in S1 comprises:
   placing a scanning probe at a leftmost position of an upper end of the oversized metal material in a Y direction, and performing single pulse spark discharge scanning from left to right in an X direction; and after scanning of a first line is completed, placing the scanning probe at a leftmost position of a second line of the upper end of the oversized metal material in the Y direction, and completing scanning of the second line from left to right, and until all lines of the oversized metal material are scanned from top to bottom, to obtain the mixed distribution data of the spectral intensities of the solid solution and the inclusions of the inclusion element on the surface of the oversized metal material.

3. The single pulse spectral statistical analysis method for the particle size distribution of the inclusions on the surface of the oversized metal material according to claim 1, wherein
   the operation of performing the fitting processing on the relative frequency distribution diagram of the spectral intensities to obtain the distribution data of the spectral intensities of the inclusions in S3 comprises:
   S31: performing composite function fitting processing on the relative frequency distribution diagram of the spectral intensities, and performing fitting and peak separation to obtain a normal distribution diagram with a left main peak and a generalized Pareto distribution diagram of the inclusions with a right tailed peak; and
   S32: obtaining the distribution data of the spectral intensities of the inclusions based on the generalized Pareto distribution diagram of the inclusions with the right tailed peak.

4. The single pulse spectral statistical analysis method for the particle size distribution of the inclusions on the surface of the oversized metal material according to claim 1, wherein
   the operation of taking the test portion with the set area in the surface of the oversized metal material as the sample in S4 comprises:
   obtaining an area $S_{large}$ of the surface of the oversized metal material, and obtaining a set area $S_{small}$ of the sample; and
   the area of the surface of the oversized metal material and the set area of the sample meet the following relation:

$$T = S_{large}/S_{small}, \text{ wherein} \qquad 1.$$

T is in a range of 100 to 10000.

5. The single pulse spectral statistical analysis method for the particle size distribution of the inclusions on the surface of the oversized metal material according to claim 1, wherein
   the operation of taking the test portion with the set area in the surface of the oversized metal material as the sample, and obtaining the quantity and particle size information of the inclusions of the sample in S4 comprises:

grinding and polishing the test portion with the set area in the surface of the oversized metal material to be used as the sample, and placing the sample under a scanning electron microscope to identify and quantitatively detect inclusions that are larger than 1 µm on a surface of the sample;

at the same time, introducing an aluminum foil into an edge of the sample to correct a gray threshold of an electron microscope picture, and determining an identification brightness threshold of the inclusions; and when brightness of particles observed by the scanning electron microscope is less than the identification brightness threshold, determining the particles as the inclusions, performing energy spectrum analysis, and recording and storing the quantity and particle size information of the inclusions as well as particle size information of maximum inclusion as first data.

6. The single pulse spectral statistical analysis method for the particle size distribution of the inclusions on the surface of the oversized metal material according to claim 5, wherein the operation of taking the test portion with the set area in the surface of the oversized metal material as the sample, and obtaining the quantity and particle size information of the inclusions of the sample in S4 further comprises:

taking the test portion with the set area in the surface of the oversized metal material again, re-preparing a sample, grinding and polishing the sample to obtain the sample, placing the sample under the scanning electron microscope again, and recording the quantity and particle size information of the inclusions as well as the particle size information of the maximum inclusion as second data;

repeating the sampling operation, re-preparing a sample, grinding and polishing the sample, and recording the quantity and particle size information of the inclusions as well as the particle size information of the maximum inclusion as third data;

repeating the sampling operation until 24 sets of data are recorded; and based on an extreme value analysis method, calculating a particle size of the maximum inclusion formed on the surface of the oversized metal material by the inclusion element, wherein a particle size corresponds to a maximum intensity signal in the distribution data of the spectral intensities of the inclusions.

7. The single pulse spectral statistical analysis method for the particle size distribution of the inclusions on the surface of the oversized metal material according to claim 1, wherein the operation of correlating the particle size information of the inclusions of the sample with the distribution data of the spectral intensities of the inclusions, and determining the corresponding relation between the particle sizes and the spectral intensities of the inclusions to obtain the particle size distribution result of the inclusions on the surface of the oversized metal material in S5 comprises:

S51: classifying and counting the particle size information of the inclusions under a scanning electron microscope to obtain groups of statistical frequencies with a group distance of 2 µm;

S52: dividing the distribution data of the spectral intensities of the inclusions into the same groups based on the statistical frequency with the group distance of 2 µm under the scanning electron microscope to obtain average particle sizes and average intensities of the groups;

S53: drawing an intensity-particle size correction curve according to a relation between the average intensity and maximum intensity of each group obtained under grouped frequencies and the average particle size and maximum particle size of the inclusions; and

S54: converting an intensity-relative frequency spectrogram into an inclusion particle size-frequency spectrogram according to the intensity-particle size correction curve, multiplying the inclusion particle size-frequency spectrogram by a total spectral intensity of the inclusion element to obtain an inclusion particle size distribution diagram, and distinguishing the inclusion particle size distribution diagram by a set group distance to obtain the particle size distribution result of the inclusions.

8. The single pulse spectral statistical analysis method for the particle size distribution of the inclusions on the surface of the oversized metal material according to claim 1, wherein the oversized metal material means that any side length of the metal material exceeds 300 mm, wherein the single pulse spectral statistical analysis method is also applicable to a large-sized metal material with a side length less than 300 mm.

\* \* \* \* \*